(12) United States Patent
Morton (10) Patent No.: US 9,889,459 B2
(45) Date of Patent: *Feb. 13, 2018

(54) SYSTEM AND APARARATUS FOR COST EFFECTIVE AUTOMATED PREPARATION AND COATING FOR LARGE SURFACES

(71) Applicant: John Stephen Morton, Fort Lauderdale, FL (US)

(72) Inventor: John Stephen Morton, Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/090,551

(22) Filed: Apr. 4, 2016

(65) Prior Publication Data

US 2016/0214132 A1     Jul. 28, 2016

Related U.S. Application Data

(60) Division of application No. 13/068,147, filed on May 3, 2011, now Pat. No. 9,302,286, which is a
(Continued)

(51) Int. Cl.
*B05B 13/00* (2006.01)
*B05B 12/12* (2006.01)
(Continued)

(52) U.S. Cl.
CPC .......... *B05B 13/005* (2013.01); *B05B 12/124* (2013.01); *B05B 13/0278* (2013.01);
(Continued)

(58) Field of Classification Search
CPC . B05B 12/124; B05B 13/005; B05B 13/0278; B05B 13/0431; B05B 15/0406;
(Continued)

(56) References Cited

U.S. PATENT DOCUMENTS 4,445,451 A * 5/1984 van den Broek ......... B63C 5/02
114/222
4,702,931 A * 10/1987 Falcoff ................. G01B 17/025
118/697
(Continued)

FOREIGN PATENT DOCUMENTS

WO    WO 96/36461 A1 * 11/1996

OTHER PUBLICATIONS

Automated PaintApplication, Containment and Treatment systems (APACTS) for Dry Dock Hull Coating Operations by Robert E. Keay, Ph.D., pp. 3-5 (originally cited in parent application 11/046865 IDS).*

*Primary Examiner* — George Koch
(74) *Attorney, Agent, or Firm* — Van Dyke Law; Raymond Van Dyke (57) ABSTRACT

An apparatus and method of preparing and coating a large structure such as a ship's hull while in a dry dock wherein a plurality of spray guns disposed in an array are positioned by a robotic arm in a spaced relationship along the surface to be treated so that their spray patterns overlap. The array of spray guns is traversed downwardly and thus painting a strip whereupon the spray guns are secured, move horizontally and then are activated to be moved upwardly until another strip adjacent to and overlapping the first strip is painted. These steps are repeated until the surface area is substantially entirely painted. A shroud is provided for collecting paint oversprays and other excess paint is mounted in the array assemblage. An auxiliary spray gun may be positioned and its spray pattern adjusted to apply paint to area which were missed by the original spray pattern emanating from the array of spray guns. Travel of the system along the work surface is accomplished by a reference track, which may be virtual or actual along which an unmanned platform travels. An articulated computer controlled arm is
(Continued)

carried by the unmanned platform which in turn carries the assemblage. Other tools may be selectively operatively connected to the arm for cleaning the hull before a coating is applied thereto.

21 Claims, 4 Drawing Sheets

Related U.S. Application Data continuation of application No. 11/046,865, filed on Feb. 1, 2005, now Pat. No. 7,934,467.

(60) Provisional application No. 60/540,623, filed on Feb. 2, 2004.

(51) Int. Cl.
| | | |
|---|---|---|
| *B05B 13/02* | (2006.01) | |
| *B05B 13/04* | (2006.01) | |
| *B24C 9/00* | (2006.01) | |
| *B63B 59/00* | (2006.01) | |
| *B63B 59/04* | (2006.01) | |
| *B25J 9/16* | (2006.01) | |
| *B63B 59/06* | (2006.01) | |
| *B05B 15/04* | (2006.01) | |

(52) U.S. Cl.
CPC .......... *B05B 13/0431* (2013.01); *B24C 9/003* (2013.01); *B25J 9/1679* (2013.01); *B63B 59/00* (2013.01); *B63B 59/04* (2013.01); *B63B 59/06* (2013.01); B05B 15/0406 (2013.01); *Y10S 901/01* (2013.01); *Y10S 901/02* (2013.01); *Y10S 901/41* (2013.01)

(58) Field of Classification Search
CPC  B05B 5/085; B24C 9/003; B63B 9/00; B63B 9/04; B63B 59/06; B63B 50/045; B63B 2059/065; Y10S 901/01; Y10S 901/02; Y10S 901/41
USPC ....... 118/313, 326, 695, 70, 713; 427/427.2, 427/427.3, 8
See application file for complete search history.

(56) References Cited

U.S. PATENT DOCUMENTS

| | | | |
|---|---|---|---|
| 5,318,254 A * | 6/1994 | Shaw | ............... B25J 5/005 239/135 |
| 5,643,476 A * | 7/1997 | Garmire | ............... B08B 7/0042 219/121.68 |
| 2002/0064596 A1* | 5/2002 | Morton | ............... B05B 13/005 427/140 |

* cited by examiner

SYSTEM AND APARARATUS FOR COST EFFECTIVE AUTOMATED PREPARATION AND COATING FOR LARGE SURFACES

RELATED APPLICATION

This application is a division of U.S. application Ser. No. 13/068,147, filed on May 3, 2001, now U.S. Pat. No. 9,302,286, which is a continuation of U.S. application Ser. No. 11/046,865, filed on Feb. 1, 2005, which claimed priority to U.S. Provisional Application Ser. No. 60/540,623, filed on Feb. 2, 2004.

FIELD OF THE INVENTION:

This invention relates generally to an environmentally friendly, waste minimizing and cost-effective preparation and coating methodology and apparatus utilizing automated systems for preparing and coating large surfaces.

BACKGROUND OF THE INVENTION:

Large surfaces, such as ships' hulls, which may be supported in dry docks, are disclosed in U.S. Pat. No. 3,611,849 to Hammelmann and U.S. Pat. No. 3,915,092 to Van den Brock. Both patents describe the preparation of a hull for surface-treating and subsequently spray painting the hulls. In the Hammelmann patent a carriage is disclosed having horizontal and vertical support structures which are movable along the top and vertical surfaces of the dry dock's sidewalls. A surface-treating device in or on a gondola can be disposed at least to the central longitudinal plane of the dry dock. This enables the device to treat the surface of the ship's hull from bow to stem. In other words, the gondola can be moved from the deck of the ship in dry dock along the surface of the hull to the ship's keel. The orientation of the device can be automatically changed in response to changes in the inclination or curvature or both of the adjacent surface being treated. The gondola can support one or more attendants or one or more surface-treating devices such as for the discharge of highly pressurized water against the surface of the hull to remove existing paint and prepare the hull for spray painting. Hammelmann also teaches an apparatus intended for grit blasting of ship's hulls. The object is to treat large surfaces having contours relatively quickly. Unlike the apparatus of Hammelmann described above, Van den Brock discloses a support for carrying a two-arm device for supporting equipment on rails mounted along a vertical side of the dry dock. The treating apparatus may be sand or grit blasting nozzles, rotary cleaning equipment or paint spray nozzles which are arranged to have slightly overlapping areas.

Attention is also invited to U.S. Pat. Nos. 4,285,469 and 4,445,541, also to Hammelmann and Van den Brock respectively. In the latter Van den Brock patent, the processing member for treating ships' hulls comprises horizontal guide wheels and vertical guide wheels for horizontal movement and vertical movement, respectively, along the hull. The orientation of these wheels can be automatically changed so that the processing member moves horizontally or vertically, as desired.

Numerous patents have been issued which relate to the painting of automobile bodies, such as, for example, U.S. Pat. No. 4,721,630 to Takeo et al, wherein painting robots are arranged to be moveable on rails on each side of the automobile. The same is true in respect of aircraft, for, example, U.S. Pat. Nos. 3,460,177 and 5,248,341 to Rhinehart, et al and Berry, Jr. et al, respectively.

Where the surfaces to be treated are not enclosed, such as ships' hulls, silo walls, oil storage tanks, and the like, compliance with environmental laws and regulations are required. The problems associated with environmental compliance are set forth in U.S. Pat. No. 5,398,632 to Goldbach, et al wherein the need for confined work areas for the clean blasting and the recoating of vessels at dry docks is met, at least in part, by covering the areas of the clean blasting and coating operations as they take place.

The Naval Surface Warfare Center, Carderock Division, developed an automated painting system for hulls that could be used in Navy and commercial dry docks. Attention is invited to the article: APACTS Represents Apex an Environmentally Friendly Painting, page 52 of CURRENTS, the Navy's Environmental Magazine, Winter 2003. APACTS is also described in iMAST, a quarterly of the Institute for Manufacturing and Sustainement Technologies 1999 No. 4, in which the feature article is: Automated Paint Application, Containment, and Treatment System (APACTS) for Dry Dock Hull Coating Operations by Robert E. Keay, Ph.D. The iMAST article states that an automated paint application containment and treating system (APACTS) was born in early 1997 and wherein the concept was to develop a mobile, semi-automated, robotics-control (but with real-time operator input) platform that can simultaneously apply paint and capture overspray during dry-dock ship hull coating operations. Surveys indicated that there were no patented or commercially available mobile and "at-the-nozzle" overspray collection means then in existence. The captured overspray is directed to an appropriate physical, possibly chemical, treatment system which also must be mobile in design. The envisioned advantages were that faster and more uniform rates of paint application would reduce manpower and improve compliance with growing regulations for control of air and water pollutants. With airless paint spray systems, it had been observed that paint overspray was caused when small paint particles having insufficient mass to reach the target were carried away by the entrained airflow. It was estimated that paint particles of fifty microns or less were most likely responsible for the overspray. A shroud-like enclosure surrounding the paint spray gun was recommended. Its principle was to take advantage of the natural velocity generated by the impingement of the spray to separate the overspray containing wall jet from the wall and direct it to a suction outlet. The paint applicator and capture shroud control concept envisioned employ two serially linked manipulators under some common supervisory control. This approach provided five degrees of freedom when the large manipulator is stationary.

The Carderock Division of the Naval Surface Warfare Center's automated paint application, containment and treatment system, (APACTS) to apply anti-corroding and anti-fouling paints in an environmentally sound manner has been developed and tested. The APACTS System utilizes a self-propelled mobile base which supports a long reach macro-manipulator which in turn carries a quick response micro-manipulator to maneuver a paint spray gun and containment device along the hull of the ship. The APACTS design is strictly for coatings application and requires direct operator control. The system does not perform other processes such as surface preparation or monitoring or diagnostic functions.

In view of the foregoing it should be appreciated that a recognized need exists for the automated preparation and painting in outdoors environments as well as in some indoors environments, without waste and environmental contamination, large substantially vertical surfaces, particularly hulls of ships while in dry clock, but also fuel storage tanks, grain elevators and other large structures, substantially automatically with minimal human effort other than for programming and monitoring the process.

SUMMARY OF THE INVENTION

The invention is a computer-controlled, mobile robotic system that by interchangeable tools and being guided by sophisticated interrelated computer programs, automatically performs surface preparation, coating application and surface measurement, and diagnostic operations for the treatment of large surfaces. An example of such a surface is a large ship's hull, but the invention may also be used for the automated surface preparation and coating of many different large surfaces requiring same.

The first step of the methodology is to acquire surface measurement data that defines the targeted work surface. This may include any variety or combination of technical means available, such as, but not limited to, the use of designer CAD file input, digital imaging and laser mapping. This data is used in an existing process to program robotically controlled arms for treatment operations. Attention is invited to U.S. Pat. Nos. 6,365,221 and 6,562,139 which, in part, describe a data measurement acquisition method. Acquisition of surface data is also useful in the calculation and estimation of the amount of materials or cycle times required to treat the surface involved which, in turn, allows for increased accuracy in the planning of such project along with reduced environmental impact.

Industry is increasingly being automated. Automotive manufacturers have, for many years, painted automobile bodies by automated means. Robots with articulated arms, outfitted with any one of a variety of types of spray equipment are programmed automatically to paint automobile bodies of varying configurations. Typically these robots are affixed in a stationary position and perform their operations as programmed while an assembly line moves automobile bodies through the paint booth. Paint is uniformly applied in a repeated fashion while material waste is minimized in the process.

In contrast to what is described above and taught by the prior art wherein articulated arms are mounted on the sides of it dry dock to perform their task, the instant invention comprises a computer-controlled mobile system which moves along, as an example, the deck of a dry dock or along the side of any variety of large work surfaces while the attached, automated, articulated robot arm, its tools and materials, efficiently provide a specified coating system. The mobile system is programmed to move along a line which may be a virtual line such as determined by a global positioning satellite system, laser guided positioning system, or digital video imaging system or an actual line which is in one way or another either temporarily or permanently positioned and fixed to the deck of the dry dock adjacent the ship's hull. By use of appropriate sensors, the mobile system acquires positioning or guidance data from the line, virtual or actual, which is then processed by the mobile system to enable its movement alongside and relative to the work surface. This is accomplished in coordination with the surface measurement data previously acquired and processed.

After surface measurement data is acquired, processing and the mobile system guidance instructions are programmed, the system selects the appropriate tool for the next task to be performed. The computer processes data received to determine the optimum tool path for the process step to be performed. The upper end of an articulated arm is designed to carry a variety of tools connected by means of an interchangeable wrist. A single mobile system can be used to perform mobile process steps, one step at a time, by tool exchange or a plurality of mobile systems can individually hold various tools and act in tandem performing service preparation followed directly by coating application.

With the area to be painted having been appropriately evaluated, service preparation and recovery is employed which includes a cleaning and surface preparation apparatus, preferably Ultra High Pressure (UHP) water jets and a vacuum shroud for recovery, and a means for filtration of spent water and removed material.

The coatings application which is disclosed herein encompasses a plurality of spray heads and sensors in a vacuum shroud configuration designed to control and optimize the uniform application of coatings while addressing environmental concerns.

Prior to the application of coatings, typically the surface of the targeted work is cleaned and prepared for application of the coatings. This step typically requires removal of oxides, chlorides, rust and other contaminants as well as the removal of existing coatings. A preferred surface preparation tool incorporates UHP water blasting methods and also provides a means of debris capture, water filtration and recycling by utilizing a vacuum shroud which is sufficient to meet environmental compliance concerns. The tool is physically attached to the end of the articulated robot arm and functions as an end effector while being connected to various supply lines requisite for its operation. Appropriate sensors are positioned on the tools to acquire real time data to position the tool and assist in carrying out the process.

The physical attachment may be accomplished automatically by robot programming and utilizing an interchangeable wrist, or in part, it may be assisted by a technician monitoring the system's operation. Once attached, the required UHF water pressure lines, vacuum conduits, filtration and recycle lines, if provided, may be connected by a technician or connected by automatic means. Utilizing the previously acquired surface measuring data, the system engages a work surface and is directed by a computer in a prescribed manner to accomplish the surface preparation process. The surface preparation tool is properly positioned relative to the work surface in a fashion required by the method used. Speed of movement, both vertically and horizontally, is determined by the extent of surface preparation required as assessed automatically through real time digital image processing, or through manual inspection means, or both. In as much as each work surface may be different and provide a unique challenge, the system is thus capable of operating in both automated and manual modes. The actual service preparation process may, at times, require intervention by a technician for direct operator control. This may be necessary for particular problem areas or for sections that automated means and tooling may find it hard to reach and consequently may be impractical. The requisite equipment associated with the surface preparation, power pumps, vacuum filtration and recycling system, etc. may be simply located in the work area to facilitate the service preparation procedure. Alternatively, the equipment may be positioned on an adjacent mobile supply platform which moves in concert with the mobile system. Once the surface preparation step has been completed and properly verified, the coatings application problem can then commence. In a like fashion as described above, the coating application tool is also physically attached to the wrist at the end of the robot arm and functions as an end effector. Fluid, air and electrical supply lines, if required, are all properly attached thereto. This may be, again, accomplished by automatic means through robot programming and utilizing the interchangeable wrist, or it may be assisted as necessary by a technician monitoring the system's operation. Appropriate sensors are positioned on the coating tool to acquire real time data for positioning and to assist in carrying out the process as well as to ensure maximum uniformity and accuracy in application of the coatings. Requisite supply equipment associated with the coating application process is preferably centrally located to facilitate the surface preparation procedure. Alternatively, the supply equipment may be positioned on an adjacent mobile supply platform which moves in concert with the supply system. Included in the application equipment for the coatings is a means by which automated material re-supply is accomplished without stopping the coating process. To accomplish automated re-supply, appropriate monitoring devices are incorporated in the system.

The equipment comprising the mobile system is not a permanent installation in or at a dry dock or other facility, but rather may be lowered into the work area or removed by cranes as needed.

The system essentially requires the integration and coordination of two major software programs. The first controls movements of the mobile system alongside the work piece, for example, along a ship's hull from bow to stern. The second program has the primary task of maintaining the tool position relative to the surface being coated. The proximity, stand-off angle and speed with which the tool is positioned and moved in relation to the work surface is determined by the function being performed and the data necessary to be collected to enable automatic operations. A sensor for measuring the thickness of coatings is integrated into the automated coating process to report the thickness of the coatings in real time, thus permitting enhanced control and uniformity of the coatings application process. The software program may also include the surface data acquisition routines or may be a stand-alone element. All programs are interrelated and as such have the necessary interfaces with each other to enable the desired operations of the invention. Care is taken to implement methods of process, checking, and error avoidance.

Other objects, adaptabilities and capabilities of the invention will appear as the description progresses, reference being had to the accompanying drawings, in which:

DESCRIPTION OF THE PREFERRED
EMBODIMENTS OF THE INVENTION

The invention eliminates or minimizes paint wastage for the painting of ships hulls and other large outdoor structures and, at the same time, provides a uniform thickness in the application. The painting system of the invention is essentially fully automated whereby there is no need for an operator to be provided on the self-energized and self-propelled mobile platform for controlling the motion of the platform along a side of the ship's hull or other large structure to be painted while performing the painting function.

Figure 1:
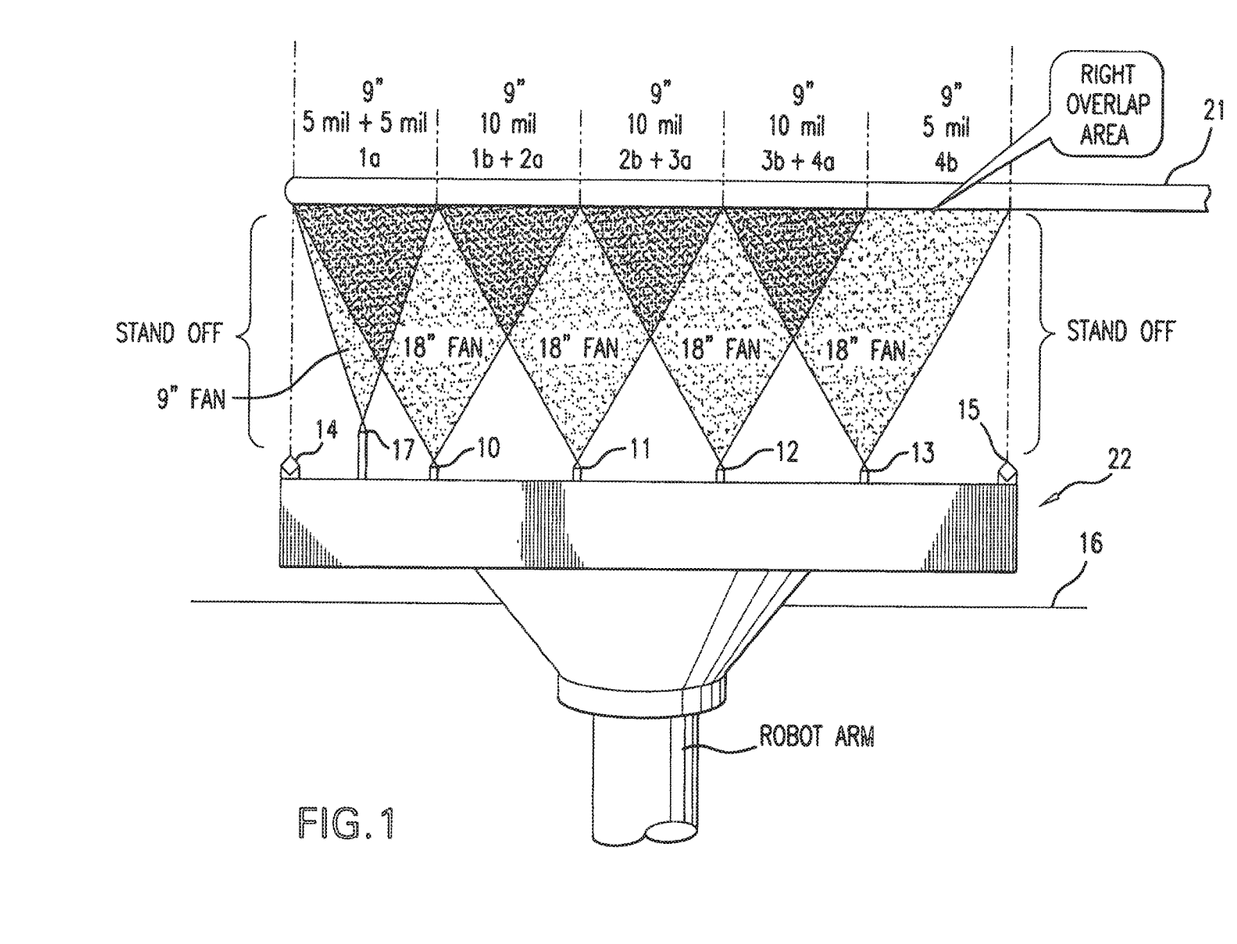
FIG. 1 is a schematic plan view clan array of paint spray guns as used at the bow of a ship's hull which is being painted.

As seen in the figures, the mobile support platform 20 follows a line 16 which as described above may be actual or virtual. As shown in FIG. 1, for painting the exterior surface of a ship's hull 21, an assemblage unit or array 22 a paint spray guns provided. Along the array there are five paint spray guns 10, 11, 12, 13 and 17, each of which can provide adjustable spray fan patterns. Thus a forty-five inch width spray pattern is provided using the four spray guns, each of which provides an eighteen inch in width spray fan pattern. This is accomplished by paint spray guns, 10, 11, 12, and 13 which arc aligned horizontally. The auxiliary spray gun 17 is adjusted to provide a nine inch width spray fan pattern. Accordingly, the paint spray pattern emanating from the four spray guns 10, 11, 12, and 13, and the auxiliary spray gun 17, as illustrated in FIG. 1 provide a forty-five inch wide spray pattern commencing on the left as seen in FIG. 1 at the stem 24 of the ship that has the hull which is being painted. Each spray gun, 10, 11, 12, 13, and 17 is positioned perpendicular to the working surface. The spray guns spray patterns are offset sufficiently to avoid paint collisions whereby the patterns may be in a shallow echelon or alternate.

Figure 2:
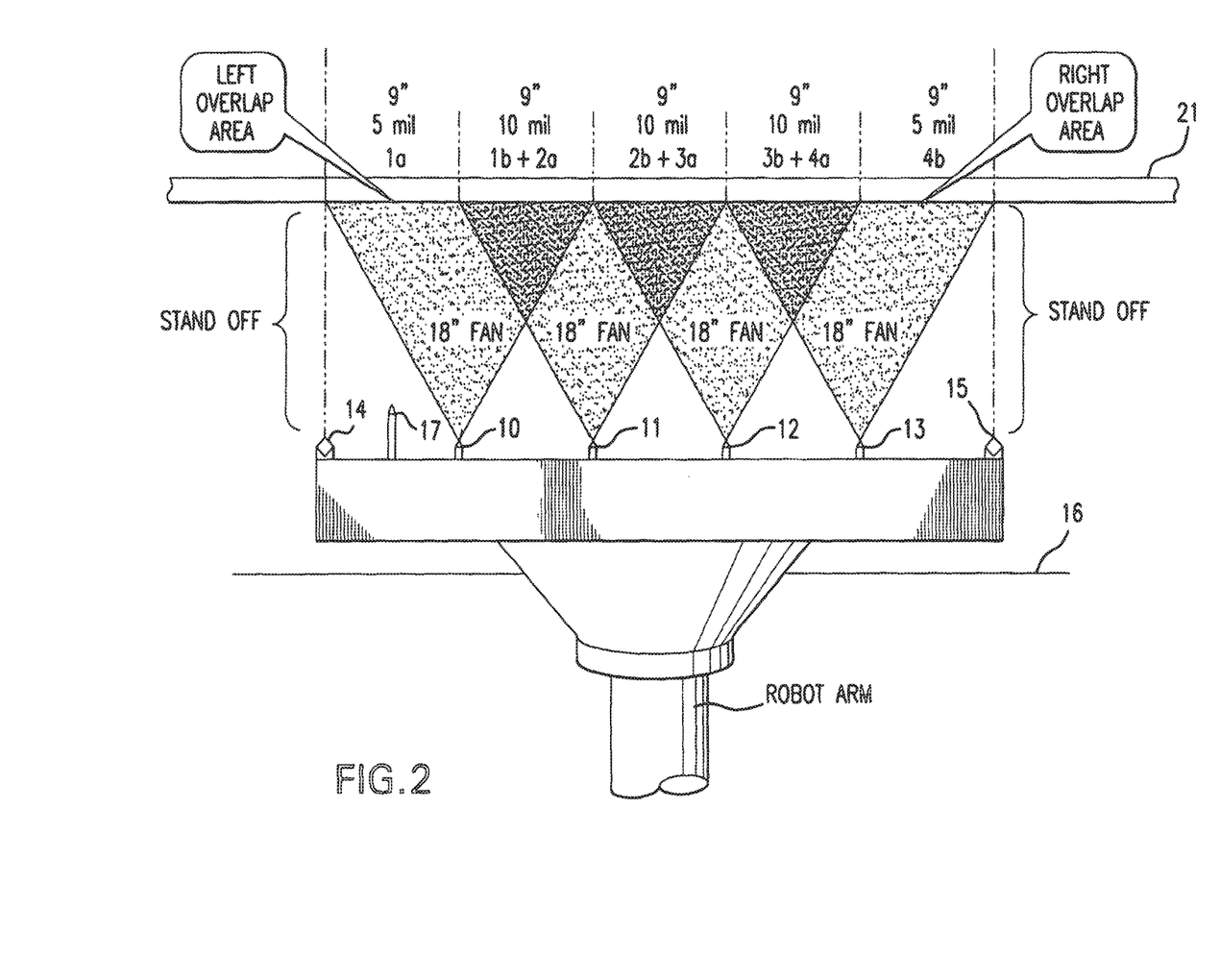
FIG. 2 is a schematic plan view of the array of paint spray guns as shown in FIG. 1 which illustrates the spray patterns used for the upward mu adjacent to that illustrated in FIG. 1 as well as further runs which apply paint to the ship's hull until reaching the stern of the ship.

Assuming, for example that a uniform thickness of ten mil. is desired to be applied to the ships hull 21, initially a left end sensor 14 of the robotic system locates the top left corner point of hull 21. As a robot faces the ship's side to be painted using position sensors mounted at either side of the paint spray system, the robot positions the array 22 so that, commencing at the top forward edge of the ship's hull 21, array 22 is parallel to and the spray guns are pointed at hull 21. The spray paint gun array 22 is supplied with paint so that when the paint impacts the surface, each spray gun pattern leaves a five mil. thickness of paint. Each of the four spray guns, 10, 11, 12, and 13 sprays an eighteen inch wide fan pattern and the auxiliary gun 17 sprays a nine inch wide fan pattern depicted in FIG. 1. As the paint is being applied, array 22 is moved vertically downwardly at a uniform rate relative to hull 21, maintaining a uniform distance from hull 21 until an entire forty-five inch wide strip on hull 21 is painted to the ship's waterline 25. After reaching the end of the vertical travel to waterline 25 of the ship, spray paint gun array 22 is secured and moved thirty-six inches to the right at waterline level 25 of hull 21, the paint supply to auxiliary gun 17 is secured, and with the other spray guns being activated, painting is resumed by moving the paint gun array 22 vertically upwardly adjacent along hull 21 with a nine inch overlap on the strip just painted as shown in FIG. 2 until the next strip is painted by array 22 after being secured, shifted thirty-six inches to the right and reactivated again moving to the ship's waterline 25. After reaching the end of the vertical travel to waterline 25 of the ship, the spray paint gun array 22 is again moved thirty-six inches to the right at the waterline of hull 21 while the paint supply to the spray guns is secured and painting is resumed by moving the paint gun array 22 vertically upwardly adjacent to the just painted strip along the hull 21 with a nine inch overlap on the strip just painted until the next strip is painted in a downwardly manner to waterline 25 whereupon the process is continued until the stern of the ship has been reached as signaled by sensor 15. If portions of the stern are above the waterline then the downward limits of each such strip coincide with the longitudinal center line of a ship's hull 21. In painting the last strip, paint spray guns in the left portion of array 22 are secured or adjusted as necessary to prevent overspray. If desired, painting of the last strip on the right hand side of hull 21 may be deferred for subsequent touch up by paint spray gun 17.

When the painting of the ship's hull 21 is completed between its upper edges and down to the waterline 25 another paint appropriate for underwater use is spray painted between the waterline and the keel of the ship in the same manner described above which may require the temporary removal of selected keel blocks to ensure that the coating of the underside of hull 21 is complete or the program may provide that the keel portion be painted by paint spray gun 17 in a separate operation.

Figure 3:
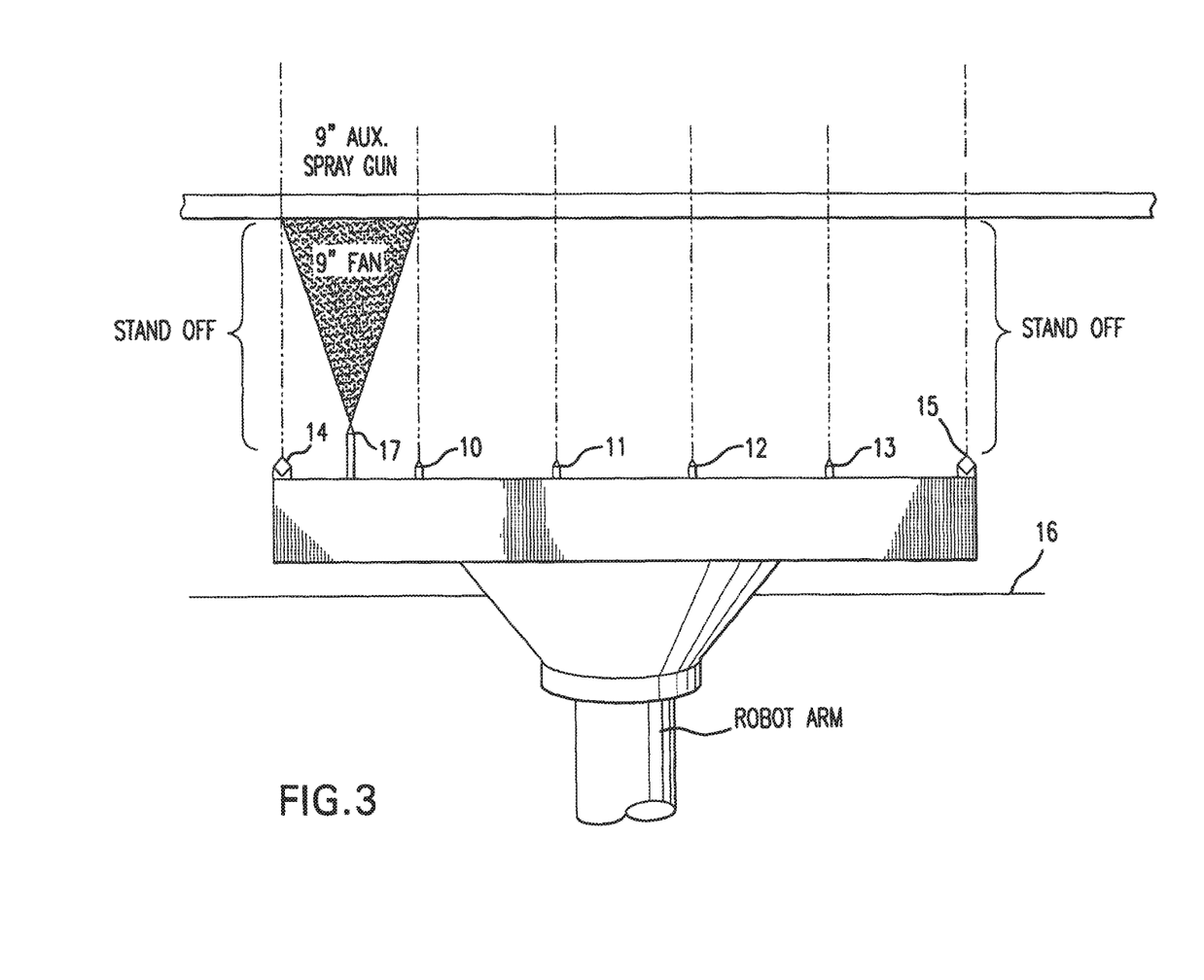
FIG. 3 is a further schematic view of the spray paint array shown in FIGS. 1 and 2 which illustrates the use of one of the paint spray guns for touchup operations.

As indicated above, certain areas to be painted may be reserved for the touch-up spray paint gun 17 as illustrated in FIG. 3. But this does not necessarily mean that the touch-up areas are not automatically painted as a part of the original programming for the ship involved. Usually these areas will be at or close to the stem and stern of the vessel being painted and also around openings in hull 21 such as the condenser cooling water outlet. In each case, the desired thickness of the coating such as ten mil. will be used unless in certain areas, a thicker coating may be specified.

It is emphasized that the travel of the robotic painting system along the length of the ship's hull 21 is accomplished without a person being positioned in mobile platform 20. A guidance system using ultrasonic, infrared, laser or other means is mounted on the chassis of mobile platform 20 which reads a reference track 16 that may be a painted line, laser line, tape line, or may be virtual such as is possible with GPS, LGPS or other means. In this manner automated movement of mobile platform 20 in relation to the ship's hull 21 or any other large structure to be painted may be automated. As mobile platform 20 moves along reference line 16, the positioning of array 22 or equipment used for cleaning the hull of the ship in preparation for painting is controlled in relation to the ship's hull 21 by data from sensors 14 and 15, or any other structure being painted, by sensors operatively connected to array 22 or other equipment via control of the articulated arm 27.

Figure 4:
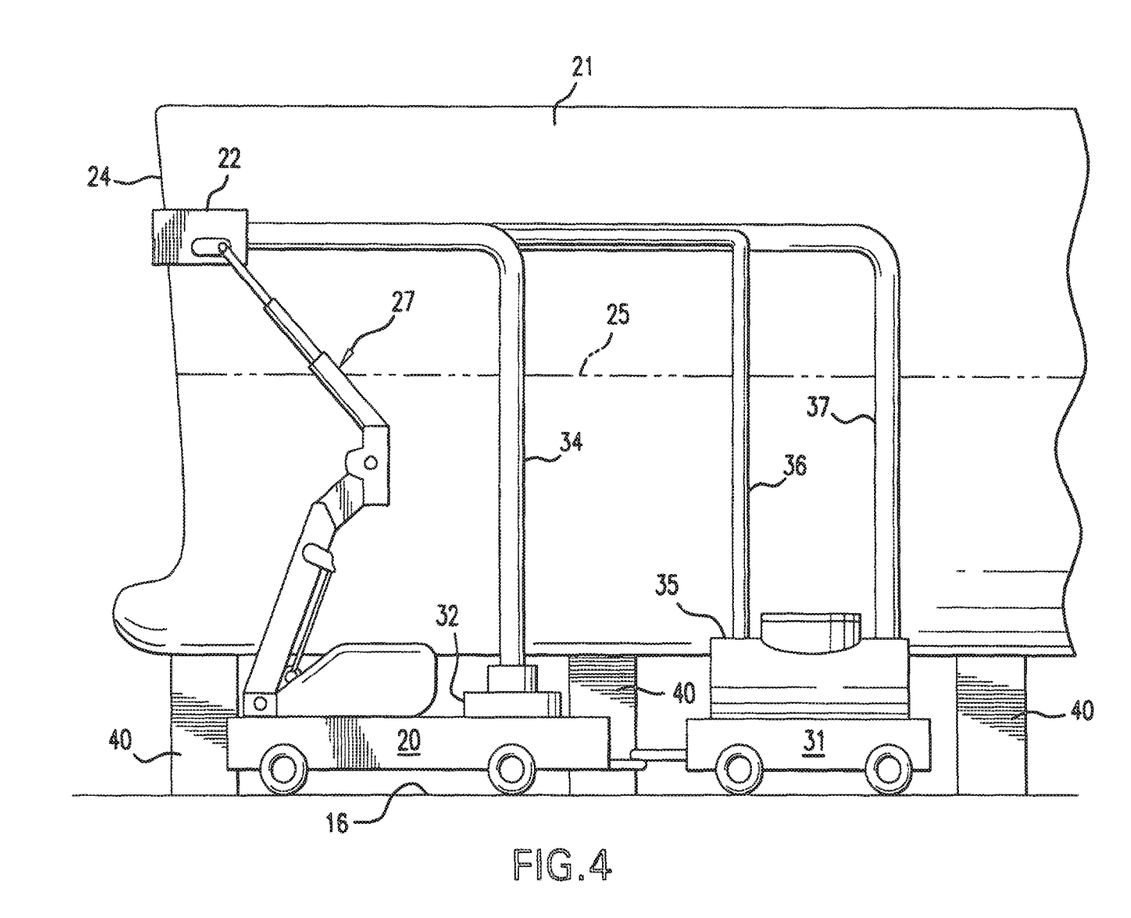
FIG. 4 is a schematic view which illustrates the other component parts of the invention including the mobile platform, the wagon trailer, the automated articulated arm assembly and the treatment stage for cleaning or painting a ship's hull mounted on the end of the articulated arm assembly.

FIG. 4 is schematic drawing which illustrates the combined components of the invention. An important aspect of the invention is its capacity to provide the automated treatment of large structures such as, in particular, the exteriors of ships' hulls. Before said structures are painted it is, as previously indicated, usually necessary to remove existing paint and clean the surface of the structure in preparation for the painting operation. Many systems exist for cleaning various structures for the purpose of coating same. For example, sand, fiber blasting media impregnated with alumina, steel grit and other types of grit may be propelled against the surface to be painted whereby existing paint, corrosion and adhering sea flora and fauna are removed. In such case, the sand or grit or other blasting media, and the removed material needs to be collected and disposed of or filtered out and re-circulated. For ships' hulls, I prefer the use of ultra high pressure water jets. For an effective system, the jets need to be shrouded and the excess water, together with the removed paint and corrosive matter, is filtered. The water, once filtered, can be re-circulated or disposed of. The material which has been filtered from the water is disposed of in an appropriate manner, but may also be, in some cases, reclaimed for use as a fuel or otherwise.

In FIG. 4, an assemblage unit, array 22, may be considered in an extensive sense for illustrative purposes, as a means for removing paint and cleaning the surface to be painted in which case the material which has functioned for removal, that may be water or spent grit together with removed paint, corrosion, etc. is transferred from assemblage unit 22 which is shown in FIG. 4 via a conduit 37 to container 35 and the filtered water is re-circulated. This may be accomplished through piping of 36. As discussed previously, container 35 may be carried in a wagon 31 which is towed by mobile platform 20. Assemblage unit 22 invariably incorporates a shroud and other means for collecting material removed from the surface being cleaned. It should be appreciated that unit 22 can be controlled for movement in the same manner as discussed for the automated painted process except that normally the cleaning operation is the same whether above or below waterline 25. In the painting operation, container 35 may, again in an extensive sense for illustrative purposes, contain the paint to be applied to the ship's hull. Normally this would be accomplished by a plurality of fifty-five gallon drums of paint being carried by wagon 31. However, any adequate type of container or containers may be employed for this purpose. If a plurality of the barrels or other containers are used then an arrangement is required for the containers to deliver the paint therein in series. For the cleaning or painting purposes, mobile platform 20 automatically follows line 16 whether marked or virtual. For the cleaning operation, the articulated arm 27 is programmed to move over substantially the entire surface of hull 21 from stem 24 to stern. In the painting operation, any paint which may escape adherence to hull 21 such as overspray is removed by vacuum via vacuum source 32 through conduit 34 whereupon it may be conveyed to a container 35 carried by wagon 31. In FIG. 4, keel blocks 40 are shown. Normally the keel blocks are constructed of wood, but, if movable and automated their removal and replacement may be arranged as part of the automated system of the invention. Openings such as for an anchor or for condenser cooling water are not shown in FIG. 4 even though they are likely to be present on one side or both sides of the vessel. However, with automated cleaning equipment and touch-up spray painting guns 17, both automated cleaning and automated painting around these openings and to some extent within such openings, if desired, may be provided.

Provisional Application Ser. No. 60/540,623 and prior patents and publications referred to herein and in such Provisional Application are incorporated by reference. The computer programming and the designs of the articulated arms are well within the expertise of those skilled in such arts. Although UHP water jets are preferred means for the initial step of preparing a surface for coatings, other known processes may be employed such as abrasive cleaning with sand or grit, including steel grit. Also various known means for applying coatings may be utilized including airless, air assisted airless, air, a spinning disc, triangular or fan-shaped spray, round, oval or elliptical spray patterns, and conical shapes spray patterns may be utilized. The coatings may be primer, anti-fouling, anti-corrosive, powder, metallic such as nickel flame coatings similar to those prescribed by the Corps of Engineers for painting bridges, polyurethanes, polymers, epoxies and other coating materials known to the art may be used. The coatings may be applied with electrostatic charges usually in ranges to 50,000 to 100,000 volts whereupon their adherence to a grounded steel hull is enhanced. For coatings which arc heated to provide fusion or melting, heating means of an appropriate source may be employed such as a laser as part of the coating tool. The invention thus not only applies to conventional coating material, but also to processes for applying unconventional materials by unconventional means. It will be further understood that although I have disclosed the preferred embodiments of my invention, it is capable of other adaptations and modifications within the scope of the following claims:

I claim:

1. A mobile device for the automated treatment of a surface of a large structure comprising:
    an unmanned computer-controlled mobile platform, said mobile platform adapted to move along a virtual line adjacent to said large structure and continuously updated by a computer, the automated movement of said mobile platform along said virtual line being flexible, dynamic and substantially continuous,
    wherein said automated movement along said virtual line is not along a track;
    at least one articulated computer-controlled arm, said at least one articulated computer-controlled arm mounted onto said mobile platform;
    at least one tool, said at least one tool affixed to respective terminal ends of said at least one articulated computer-controlled arm; and
    at least one sensor, said at least one sensor being associated with each said at least one tool, wherein the relationship of each said at least one tool with regard to said surface of said large surface is computer-controlled.

2. The mobile device according to claim 1, wherein said at least one tool comprises a sprayer, said automated treatment being the spraying of a treatment material on said surface.

3. The mobile device according to claim 2, wherein said sprayer comprises a paint sprayer.

4. The mobile device according to claim 2, wherein said sprayer comprises an array of spray guns, said automated treatment comprising moving said array of array guns a uniform distance from said surface and at a uniform speed across said surface, whereby a substantially uniform coating thickness is applied.

5. The mobile device according to claim 4, wherein said array of spray guns sprays said treatment material in substantially fan-shaped patterns across said surface.

6. The mobile device according to claim 5, wherein said fan-shaped patterns overlap.

7. The mobile device according to claim 6, wherein said fan-shaped patterns overlap each other at about 50%.

8. The mobile device according to claim 6, wherein said fan-shaped patterns are triangular as seen in a direction parallel to said surface.

9. The mobile device according to claim 4, wherein one of said sprayers in said array of spray guns is controlled independently of another spray gun in said array of spray guns.

10. The mobile device according to claim 4, wherein one of said sprayers in said array of spray guns is independently controllable relative to another spray gun in said array of spray guns.

11. The mobile device according to claim 4, wherein adjacent of said patterns from adjacent corresponding spray guns are slightly offset to avoid substantial collisions occurring in coating material sprayed by said corresponding paint spray guns.

12. The mobile device according to claim 11, wherein said patterns are offset one from the other in a shallow echelon arrangement.

13. The mobile device according to claim 1, wherein at least one of said at least one tools comprises a surface cleaning tool, said surface cleaning tool removes existing coatings, corrosion, rust adhering to said surface from said surface.

14. The mobile device according to claim 13, wherein said surface cleaning tool is selected from the group consisting of water jets, ultra-high pressure water jets, abrasive sprayers, sponge jets, laser coating ablation, and combinations thereof.

15. The mobile device according to claim 1, wherein said at least one tool further comprises at least one thickness sensor, said at least one thickness sensor operatively associated with said at least one tool for measuring the thickness of a material treatment coating in real time as it is being applied to said surface.

16. The mobile device according to claim 1, wherein at least one of said at least one sensor senses the status of treatment across said surface.

17. The mobile device according to claim 1, wherein said large structure is a ship in a dry dock, said mobile device guiding the treatment along said virtual line, said virtual line being substantially parallel to the longitudinal axis of the ship.

18. The mobile device according to claim 1, wherein the treatment of the surface is accomplished in separate operations.

19. The mobile device according to claim 18, wherein said surface is a ship hull, the separate operations of the treatment of the surface comprising the portion of said ship hull above the ship's waterline and the part of said hull below said ship's waterline.

20. The mobile device according to claim 1, further comprising:
    at least one shroud, said at least one shroud covering the portion of said large surface under treatment.

21. The mobile device according to claim 20, wherein said at least one shroud is a vacuum shroud.

* * * * *